United States Patent
Trainer et al.

(10) Patent No.: US 9,825,554 B2
(45) Date of Patent: Nov. 21, 2017

(54) VOLTAGE SOURCE CONVERTER

(71) Applicant: General Electric Technology GmbH, Baden (CH)

(72) Inventors: David Reginald Trainer, Alvaston (GB); Omar Fadhel Jasim, Wollaton (GB); Jonathan Charles Clare, Keyworth (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 15/123,091

(22) PCT Filed: Mar. 4, 2015

(86) PCT No.: PCT/EP2015/054546
§ 371 (c)(1),
(2) Date: Sep. 1, 2016

(87) PCT Pub. No.: WO2015/132310
PCT Pub. Date: Sep. 11, 2015

(65) Prior Publication Data
US 2017/0077834 A1    Mar. 16, 2017

(30) Foreign Application Priority Data
Mar. 5, 2014 (EP) .................... 14275043

(51) Int. Cl.
*H02M 7/217* (2006.01)
*H02M 7/483* (2007.01)
(Continued)

(52) U.S. Cl.
CPC ......... *H02M 7/2173* (2013.01); *H02M 7/483* (2013.01); *H02M 7/217* (2013.01);
(Continued)

(58) Field of Classification Search
CPC ............ H02M 7/04; H02M 7/12; H02M 7/14; H02M 7/143; H02M 7/146; H02M 7/15;
(Continued)

(56) References Cited

U.S. PATENT DOCUMENTS

| 2012/0069610 A1* | 3/2012 | Trainer | H02M 7/49 363/35 |
| 2012/0188803 A1* | 7/2012 | Trainer | H02M 1/4233 363/37 |

(Continued)

FOREIGN PATENT DOCUMENTS

| EP | 2858231 A1 | 4/2015 |
| GB | 2519793 A | 10/2013 |

(Continued)

OTHER PUBLICATIONS

European Search Report and Opinion issued in connection with Related EP Application No. 14275043.9 dated Oct. 24, 2014.

(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A voltage source converter comprises first and second DC terminals for connection to a DC network, and at least one limb connected between the first and second DC terminals. The or each limb includes: a phase element including two parallel-connected sets of series-connected switching elements connected in an H-bridge to define first and second diagonal switching pairs, a respective junction between each set of series-connected switching elements defining an AC terminal for connection to an AC network; and a sub-converter configured to be controllable to act as a voltage waveform synthesizer. The voltage source converter further (Continued)

includes a controller to operate the sub-converter to selectively synthesize a driving commutation voltage to modify a DC side current at a DC side of the H-bridge to minimize any differences in magnitude and direction between the DC side current and an AC side current at an AC side of the H-bridge.

19 Claims, 16 Drawing Sheets

(51) Int. Cl.
    *H02M 7/219*     (2006.01)
    *H02M 1/00*     (2006.01)

(52) U.S. Cl.
    CPC .... *H02M 7/219* (2013.01); *H02M 2001/0058* (2013.01); *H02M 2007/4835* (2013.01); *Y02B 70/1491* (2013.01)

(58) Field of Classification Search
    CPC ........ H02M 7/217; H02M 7/219; H02M 7/42; H02M 7/44; H02M 7/48; H02M 7/483; H02M 7/49; H02M 7/493; H02M 7/537; H02M 7/5387; H02M 7/5388; H02M 7/539; H02M 7/5395; H02M 7/68; H02M 7/757; H02M 7/7575; H02M 7/797; H02M 1/083; H02M 2001/0058; H02M 2007/4835; Y02B 70/14; Y02B 70/1416; Y02B 70/1425; Y02B 70/1433; Y02B 70/1441; Y02B 70/145

See application file for complete search history.

(56) References Cited

U.S. PATENT DOCUMENTS

| | | |
|---|---|---|
| 2013/0128629 A1 | 5/2013 | Clare et al. |
| 2013/0208514 A1 | 8/2013 | Trainer et al. |
| 2013/0208521 A1* | 8/2013 | Trainer ............... H02J 3/36 363/126 |
| 2015/0295507 A1* | 10/2015 | Barupati ............. H02M 7/487 363/35 |

FOREIGN PATENT DOCUMENTS

| | | |
|---|---|---|
| WO | 2010088969 A1 | 12/2010 |
| WO | 20110127980 A1 | 10/2011 |
| WO | 2015052142 A1 | 4/2015 |
| WO | 2015062975 A1 | 5/2015 |

OTHER PUBLICATIONS

PCT Search Report and Written Opinion issued in connection with corresponding Application No. PCT/EP2015/054546 dated May 19, 2015.

Trainer et al., "A New Hybrid Voltage-Sourced Converter for HVDC Power Transmission", Cigre, pp. 1-12, 2010.

* cited by examiner

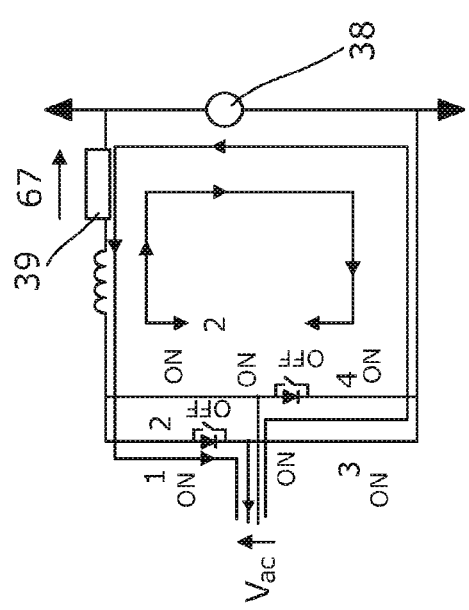
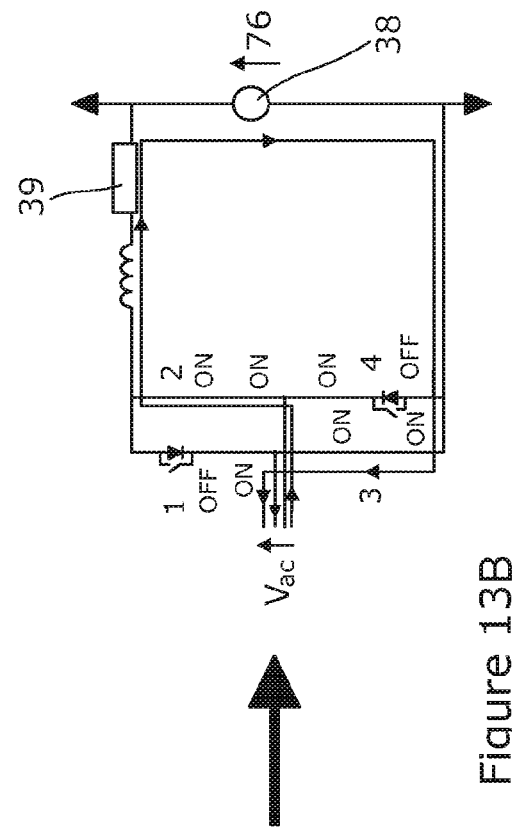
Figure 13A
Figure 13B

VOLTAGE SOURCE CONVERTER

FIELD OF THE INVENTION

Embodiments of the invention relate to a voltage source converter.

BACKGROUND

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC networks operating at different frequencies. In any such power transmission network, converters are required at each interface between AC and DC power to effect the required conversion, and one such form of converter is a voltage source converter (VSC).

BRIEF DESCRIPTION

According to a first aspect of the invention, there is provided a voltage source converter comprising first and second DC terminals for connection to a DC network, the voltage source converter further including at least one limb connected between the first and second DC terminals, the or each limb including: a phase element including two parallel-connected sets of series-connected switching elements connected in an H-bridge to define first and second diagonal switching pairs, a respective junction between each set of series-connected switching elements defining an AC terminal for connection to an AC network; and a sub-converter configured to be controllable to act as a voltage waveform synthesiser; wherein the voltage source converter further includes a controller to operate the sub-converter to selectively synthesise a driving commutation voltage to modify a DC side current at a DC side of the H-bridge so as to minimise any differences in magnitude and direction between the DC side current and an AC side current at an AC side of the H-bridge and thereby carry out commutation of current from one of the first and second diagonal switching pairs to the other of the first and second diagonal switching pairs.

In use, as shown in FIG. 1, the parallel-connected sets of series-connected switching elements are switchable to interconnect the AC and DC terminals to facilitate transfer of power between the AC and DC networks. The parallel-connected sets of series-connected switching elements may be switched at zero voltage across the H-bridge to provide low switching losses.

Whilst the voltage across the H-bridge is zero at the switching instants of the first and second diagonal switching pairs, the parallel-connected sets of series-connected switching elements are switched at zero current when the VSC operates at unity power factor (i.e. no reactive power is exchanged between the VSC and the AC network), as shown in FIG. 2. However, when the VSC is operated to exchange reactive power with the AC network, the parallel-connected sets of series-connected switching elements are switched at high levels of current, as shown in FIG. 2. In the limit, when the VSC operates as a static synchronous compensator, the parallel-connected sets of series-connected switching elements are switched at current levels near rated current (i.e. 1.0 per-unit current).

In addition, as illustrated in FIG. 3, the switching of the parallel-connected sets of series-connected switching elements is performed in the presence of DC side inductance 62 on the DC side of the H-bridge (which is contributed by the VSC components), which could be in the range of 300 µH to 400 µH, and in the presence of AC side inductance 64 (which is contributed by a converter transformer and other network inductive impedance) on the AC side of the H-bridge.

During the switching of the parallel-connected sets of series-connected switching elements, connecting the AC and DC side inductances in series with one another at different levels of magnitude and/or direction of the AC and DC side currents results in a sudden change in current required to equalise the AC and DC side currents. This is because the switching of the parallel-connected sets of series-connected switching elements inherently causes a rapid reversal of the DC side current in comparison to the AC side current with reactive power flow. This means the AC and DC side inductances are forced into a direct series connection with initially opposite current directions. This in turn will inherently lead to a large (and potentially damaging) voltage transient when a common series current path is formed between the AC and DC side inductances.

The provision of the controller in the voltage source converter according to an embodiment of the invention enables operation of the sub-converter to minimise any differences in magnitude and direction between the AC and DC side currents when commutating current between the first and second diagonal switching pairs, and thereby enable safe current switching of the first and second diagonal switching pairs. This not only prevents occurrence of the large voltage transient when a common series current path is formed between the AC and DC side inductances, but also obviates the need to connect large high voltage commutation capacitors at the DC side of the H-bridge, thus improving the reliability of the commutation operation and providing savings in terms of the cost, size and weight of the VSC.

The controller may be configured to operate the sub-converter to selectively synthesise the driving commutation voltage to modify the DC side current at the DC side of the H-bridge so as to minimise any differences in magnitude and direction between the DC side current and the AC side current at the AC side of the H-bridge when commutating current between the first and second diagonal switching pairs, and thereby enable safe current switching of the first and second diagonal switching pairs.

Optionally the controller may be configured to operate the sub-converter to synthesise the driving commutation voltage to modify a DC side current at a DC side of the H-bridge so as to cancel any differences in magnitude and direction between the DC side current and the AC side current. This means that any difference in magnitude between the DC side and AC side currents would be reduced to zero, thus resulting in little to no voltage disturbance at switch commutation.

It will be appreciated that the driving commutation voltage may be positive or negative, depending on the direction of the AC side current.

The configuration of the voltage source converter according to the invention may vary in order to be able to perform its function.

The sub-converter may be connected in parallel with the phase element. Such parallel connection of the sub-converter and phase element permits the operation of the sub-converter to support at least part of a DC voltage of the DC network that appears across the DC terminals. This obviates the need for a separate sub-converter to support at least part of a DC voltage of the DC network that appears across the first and second DC terminals, thus providing savings in terms of the size, weight and cost of the voltage source converter.

The sub-converter may be connected in series with the H-bridge. Such series connection of the sub-converter and H-bridge permits the operation of the sub-converter to synthesise the driving commutation voltage with minimal impact of the DC voltage of the DC network that appears across the DC terminals, thus maintaining a high quality DC voltage across the DC terminals, and thereby minimises (or cancels) any adverse impact the commutation operation may have on the DC side power quality.

The sub-converter may be connected in series and/or parallel with the H-bridge at the DC side of the H-bridge. The sub-converter may be connected in parallel with an electrical block including the phase element at the DC side of the H-bridge.

Each switching element may include at least one active switching device connected in parallel with an anti-parallel passive current check element.

The or each active switching device may be in the form of a self-commutated switching device. The or each self-commutated switching device may be an insulated gate bipolar transistor, a gate turn-off thyristor, a field effect transistor, an injection-enhanced gate transistor, an integrated gate commutated thyristor or any other self-commutated switching device. The number of active switching devices in each switching element may vary depending on the required voltage and current ratings of that switching element.

The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

The sub-converter may be a multilevel converter.

The sub-converter may include at least one module, the or each module being operable to selectively provide a voltage source. The inclusion of at least one module in the sub-converter provides the sub-converter with a reliable means of synthesizing a desired voltage waveform.

The or each module in the sub-converter may vary in configuration to enable it to selectively provide a voltage source.

For example, the or each module may include at least one module switch and at least one energy storage device, the or each module switch and the or each energy storage device in the or each module combining to selectively provide a voltage source. The or each energy storage device may be any device that is capable of storing and releasing energy, e.g. a capacitor, fuel cell or battery.

In embodiments of the invention, the or each module switch and the or each energy storage device in the or each module may combine to selectively provide a unidirectional voltage source. For example, the or each module may include a pair of module switches connected in parallel with an energy storage device in a half-bridge arrangement to define a 2-quadrant unipolar module that can provide zero or positive voltage and can conduct current in two directions.

In other embodiments of the invention, the or each module switch and the or each energy storage device in the or each module may combine to selectively provide a bidirectional voltage source. For example, the or each module may include two pairs of module switches connected in parallel with an energy storage device in a full-bridge arrangement to define a 4-quadrant bipolar module that can provide negative, zero or positive voltage and can conduct current in two directions.

The sub-converter may include a plurality of series-connected modules that defines a chain-link converter. The structure of the chain-link converter permits build-up of a combined voltage across the chain-link converter, which is higher than the voltage available from each of its individual modules, each providing its own voltage, into the chain-link converter. In this manner switching of the or each module switch in each module causes the chain-link converter to provide a stepped variable voltage source, which permits the generation of a voltage waveform across the chain-link converter using a stepped approximation. As such the chain-link converter is capable of providing a wide range of complex voltage waveforms.

The or each energy storage device may be any device that is capable of storing and releasing energy, e.g. a capacitor, fuel cell or battery.

The controller is configured to operate the sub-converter to selectively modify its output voltage to minimise a DC voltage at the DC side of the H-bridge. This not only permits switching of the first and second diagonal switching pairs at zero voltage across the H-bridge to provide low switching losses, but also obviates the need for additional hardware to minimise a DC voltage at the DC side of the H-bridge.

The controller may be configured to selectively switch the parallel-connected sets of series-connected switching elements to form an AC crowbar when operating the sub-converter to synthesise the driving commutation voltage. The AC crowbar defines a current path that permits at least part of an H-bridge current to flow between the AC terminals and to bypass the DC side of the H-bridge.

The controller may be configured to selectively switch at least one of the parallel-connected sets of series-connected switching elements to form a DC crowbar when operating the sub-converter to synthesise the driving commutation voltage. The DC crowbar defines a current path that permits at least part of an H-bridge current to flow in the DC side of the H-bridge and to bypass the AC side of the H-bridge.

The controller may be configured to selectively switch the parallel-connected sets of series-connected switching elements to simultaneously form the AC and DC crowbars when operating the sub-converter to synthesise the driving commutation voltage.

Formation of the AC crowbar and/or the DC crowbar in this manner helps in preventing the occurrence of DC side current reversal that would otherwise result in a large voltage transient at each switching instant of the first and second diagonal switching pairs. Otherwise occurrence of the large voltage transient may lead to converter damage and electromagnetic interference issues, which is unacceptable for a practical converter station in which switching of the first and second diagonal switching pairs occurs continuously and repeatedly. The ability to form the AC crowbar and/or the DC crowbar therefore enhances the capability of the voltage source converter to reliably and safely carry out the commutation operation.

The controller may be further configured to operate the sub-converter to selectively carry out the commutation of current from one of the first and second diagonal switching pairs to the other of the first and second diagonal switching pairs during a zero crossing period of an AC voltage at the AC terminals. This prevents the commutation operation from significantly modifying the AC voltage at the AC terminals, thus maintaining a high quality AC voltage at the AC terminals, and thereby minimises (or cancels) any adverse impact the commutation operation may have on the AC side power quality.

When each switching element includes an active switching device connected in parallel with an anti-parallel passive current check element, the controller may be configured to control the timing of the switching of the first and second diagonal switching pairs to prevent transfer of current from the anti-parallel passive current check element to the active switching device of the same switching element during synthesis of the driving commutation voltage. This prevents the active switching device from being switched at finite current, which would lead to higher switching losses.

When each switching element includes an active switching device connected in parallel with an anti-parallel passive current check element, the controller may be configured to control the timing of the switching of the first and second diagonal switching pairs to permit transfer of current from the active switching device to the anti-parallel passive current check element of the same switching element during synthesis of the driving commutation voltage. This ensures that there is no finite current flowing in the active switching device prior to being switched, thus minimising switching losses. The controller may be configured to operate the sub-converter to provide a voltage to drive the current in the anti-parallel passive current check element to zero subsequent to the transfer of current from the active switching device to the anti-parallel passive current check element.

Each switching element may include at least one first switching device connected in inverse-series with at least one second switching device so as to provide the H-bridge with forward and reverse voltage capabilities. Configuring the switching elements of the H-bridge in this manner permits operation of the voltage source converter to reliably carry out commutation of current from one of the first and second diagonal switching pairs to the other of the first and second diagonal switching pairs for both AC side current directions. For example, the controller may be configured to switch the switching elements during synthesis of the driving commutation voltage to configure each first switching device in electrical bypass and to configure at least one second switching device to support at least part of the driving commutation voltage.

For the purposes of this specification, the configuration of a switching device in electrical bypass is synonymous with the configuration of a switching device to permit current to flow therethrough.

In contrast, the use of an H-bridge with a unidirectional voltage capability (i.e. the H-bridge is incapable of supporting both forward and reverse voltages) in a voltage source converter means that the voltage source converter is capable of reliably carrying out commutation of current from one of the first and second diagonal switching pairs to the other of the first and second diagonal switching pairs for only one AC side current direction, but not both, thus limiting the current commutation capabilities of the voltage source converter.

The respective numbers of first and second switching devices may be selected to provide the H-bridge with asymmetrical forward and reverse voltage capabilities. Configuring the H-bridge in this manner permits optimisation of the number of switching devices in the voltage source converter whilst meeting the requirements of the commutation operation.

The voltage source converter may include a plurality of limbs. The phase element of each limb may be connectable via its AC terminals to a respective phase of a multi-phase AC network. The plurality of limbs may be connected in series between the first and second DC terminals.

BRIEF DESCRIPTION OF THE DRAWINGS

Some embodiments of the invention will now be described, by way of non-limiting examples, with reference to the accompanying drawings in which.

DETAILED DESCRIPTION

Figure 1A:
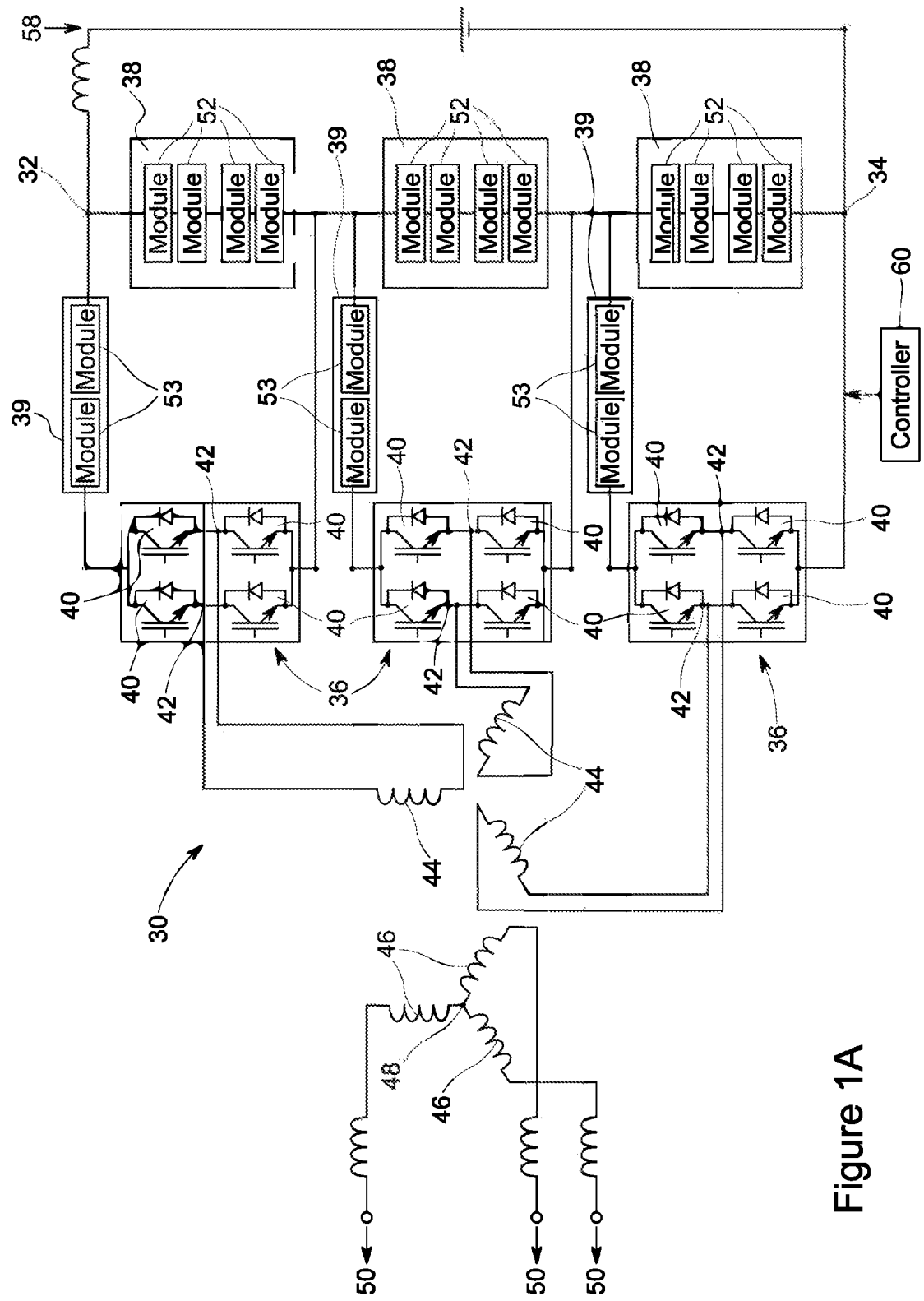
FIGS. 1A, 1B, and 1C show, in schematic form, a voltage source converter according to a first embodiment of the invention.

A first voltage source converter 30 according to a first embodiment of the invention is shown in FIG. 1A.

The first voltage source converter 30 comprises first and second DC terminals 32,34, a plurality of phase elements 36, a plurality of auxiliary sub-converters 38, and a plurality of tertiary sub-converters 39.

Each phase element 36 includes two parallel-connected sets of series-connected switching elements 40 connected in an H-bridge to define first and second diagonal switching pairs. A respective junction between each set of series-connected switching elements 40 defines an AC terminal 42.

In use, the AC terminals 42 of each phase element 36 are interconnected by a respective one of a plurality of open secondary transformer windings 44. Each secondary transformer winding 44 is mutually coupled with a respective one of a plurality of primary transformer windings 46. The plurality of primary transformer windings 46 are connected in a star configuration in which a first end of each primary transformer winding 46 is connected to a common junction 48 and a second end of each primary transformer winding 46 is connected to a respective phase of a three-phase AC network 50. In this manner, in use, the AC terminals 42 of each phase element 36 are connected to a respective phase of a three-phase AC network 50.

The common junction 48 defines a neutral point of the plurality of primary transformer windings 46, and is grounded (not shown).

The H-bridge of each phase element 36 is connected in series with a respective one of the plurality of tertiary sub-converters 39 to define an electrical block. Each auxiliary sub-converter 38 is connected in parallel with a respective one of the electrical blocks to form a limb.

Each sub-converter 38 includes a plurality of modules 52, and each sub-convertor 39 includes a plurality of modules 53.

Figure 1B:
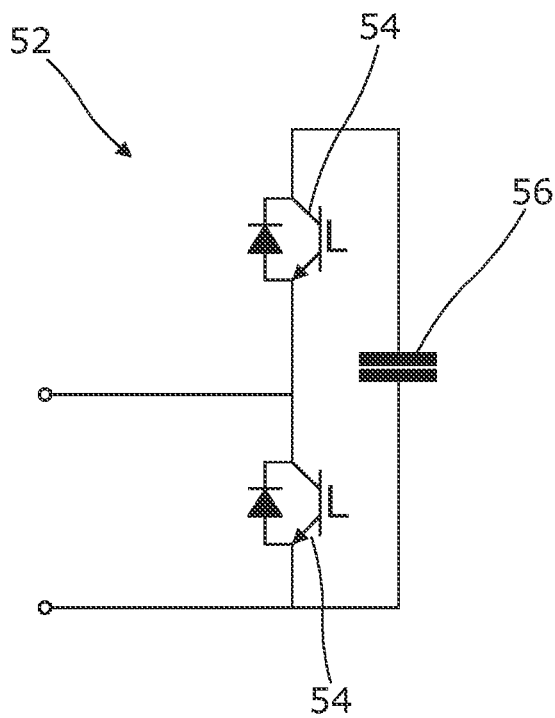

Each module 52 of each auxiliary sub-converter 38 includes a pair of module switches 54 and an energy storage device 56 in the form of a capacitor. In each auxiliary sub-converter 38, the pair of module switches 54 is connected in parallel with the capacitor 56 in a half-bridge arrangement to define a 2-quadrant unipolar module that can provide zero or positive voltage and can conduct current in two directions, as shown in FIG. 1B.

Figure 1C:
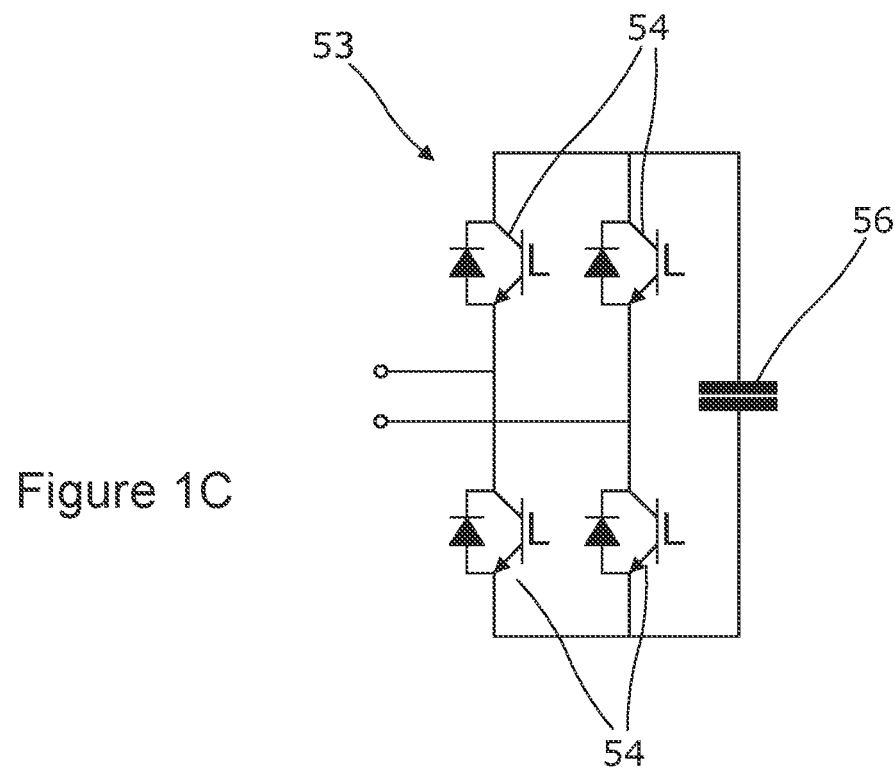

Each module 53 of each tertiary sub-converter 39 includes two pairs of module switches 54 and an energy storage device 56 in the form of a capacitor. In each tertiary sub-converter 39, the pairs of module switches 54 are connected in parallel with the capacitor 56 in a full-bridge arrangement to define a 4-quadrant bipolar module that can provide negative, zero or positive voltage and can conduct current in two directions, as shown in FIG. 1C.

The plurality of limbs is connected in series between the first and second DC terminals 32,34. In use, the first and second DC terminals 32,34 are respectively connected to first and second terminals of a DC network 58, the first terminal of the DC network 58 carrying a positive DC voltage, the second terminal of the DC network 58 carrying a negative DC voltage.

The configuration of each limb as set out above means that, in use, a DC voltage appears across the parallel-connected sets of series-connected switching elements 40 of each phase element 36.

As such, in use, the H-bridge of each phase element 36 interconnects a DC voltage and an AC voltage, i.e. the H-bridge of each phase element 36 interconnects a DC side and an AC side.

Each switching element 40 and module switch 54 includes a single active switching device. Each switching element 40 and module switch 54 further includes a passive current check element that is connected in anti-parallel with each active switching device.

Each active switching device is in the form of an insulated gate bipolar transistor (IGBT). It is envisaged that, in other embodiments of the invention, each IGBT may be replaced by a gate turn-off thyristor, a field effect transistor, an injection-enhanced gate transistor, an integrated gate commutated thyristor or any other self-commutated switching device. The number of active switching devices in each switching element and module switch may vary depending on the required respective voltage ratings of the switching elements and module switches.

Each passive current check element includes a passive current check device in the form of a diode. It is envisaged that, in other embodiments, each diode may be replaced by any other device that is capable of limiting current flow in only one direction. The number of passive current check devices in each passive current check element may vary depending on the required respective voltage ratings of the passive current check elements.

For the purposes of this specification the terms "upper" and "lower" are intended to identify the switching elements 40 in the same set, whereby the upper and lower switching elements 40 are separated by the respective junction defining the AC terminal 42. In the embodiment shown, the connection of the phase element relative to the DC terminals 32,34 means that each upper switching element 40 extends between the first DC terminal 32 and the respective AC terminal 42, and that each lower switching element 40 extends between the second DC terminal 34 and the respective AC terminal 42. The terms "upper" and "lower" are also intended to similarly identify the components of the switching elements 40, i.e. upper and lower IGBTs, and upper and lower diodes.

It is further envisaged that, in other embodiments of the invention, each capacitor may be replaced by another type of energy storage device that is capable of storing and releasing energy, e.g. a fuel cell or battery.

The plurality of series-connected modules 52, 53 in each sub-converter 38,39 defines a chain-link converter.

The capacitor 56 of each module 52, 53 is selectively bypassed or inserted into the chain-link converter by changing the states of the module switches 54. This selectively directs current through the capacitor 56 or causes current to bypass the capacitor 56 so that the module 52 provides a zero or positive voltage in the case of each auxiliary sub-converter 38, and the module 53 provides a negative, zero or positive voltage in the case of each tertiary sub-converter 39.

The capacitor 56 of the module 52, 53 is bypassed when the module switches 54 in the module 52, 53 are configured to form a short circuit in the module 52, 53. This causes current in the chain-link converter to pass through the short circuit and bypass the capacitor 56, and so the nodule 52, 53 provides a zero voltage, i.e. the module 52, 53 is configured in a bypassed mode.

The capacitor 56 of the module 52, 53 is inserted into the chain-link converter when the module switches 54 in the module 52, 53 are configured to allow the current in the chain-link converter to flow into and out of the capacitor 56. The capacitor 56 then charges or discharges its stored energy so as to provide a non-zero voltage, i.e. the module 52, 53 is configured in a non-bypassed mode.

It is envisaged that, in other embodiments of the invention, each module may be replaced by another type of module that is operable to selectively provide a voltage source, e.g. another type of module that includes at least one module switch and at least one energy storage device, the or each module switch and the or each energy storage device in the or each module combining to selectively provide a voltage source.

The structure of the chain-link converter permits build-up of a combined voltage across the chain-link converter, which is higher than the voltage available from each of its individual modules 52, 53, via the insertion of the energy storage devices 56 of multiple modules 52, 53, each providing its own voltage, into the chain-link converter. In this manner switching of each module switch 54 in each module 52, 53 causes the chain-link converter to provide a stepped variable voltage source, which permits the generation of a voltage waveform across the chain-link converter using a stepped approximation. As such each chain-link converter is capable of providing a wide range of complex voltage waveforms.

The parallel connection of the auxiliary sub-converter 38 and electrical block in each limb permits the auxiliary sub-converter 38 to selectively act as a voltage waveform synthesiser to synthesise a voltage to modify a DC side current at the DC side of the H-bridge. In addition the parallel connection of the auxiliary sub-converter 38 and electrical block permits the operation of the auxiliary sub-converter 38 to support part of a DC voltage of the DC network 58 that appears across the DC terminals 32, 34.

The series connection of the tertiary sub-converter 39 and H-bridge in each limb permits the tertiary sub-converter 39 to selectively act as a voltage waveform synthesiser to synthesise a voltage to modify a DC side current at the DC side of the H-bridge.

It is envisaged that, in other embodiments of the invention, the configuration of each auxiliary sub-converter may vary as long as each auxiliary sub-converter is capable of selectively acting as a voltage waveform synthesiser to synthesise a voltage to modify a DC side current at the DC side of the H-bridge, and the configuration of each tertiary sub-converter may vary as long as each tertiary sub-converter is capable of selectively acting as a voltage waveform synthesiser to synthesise a voltage to modify a DC side current at the DC side of the H-bridge. For example, each auxiliary sub-converter may be a multilevel converter, and/or each tertiary sub-converter may be a multilevel converter.

The first voltage source converter 30 further includes a controller 60 configured to operate the auxiliary and tertiary sub-converters 38,39.

Operation of the first voltage source converter 30 is described as follows, with reference to FIGS. 2 to 10.

Figure 2:
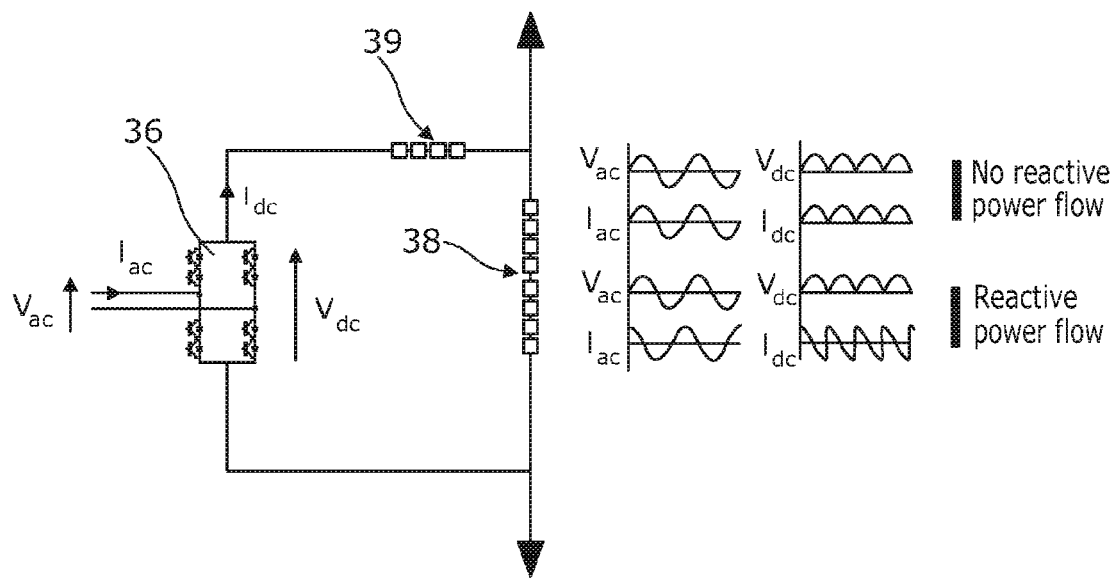
FIG. 2 illustrate, in schematic form, the changes in currents at the AC and DC sides of an H-bridge of the VSC of FIG. 1A when the VSC operates at unity power factor and when the VSC is operated to exchange reactive power with the AC network.

In use, as shown in FIG. 2, the parallel-connected sets of series-connected switching elements 40 are switchable to interconnect the AC and DC terminals 42,32,34 to facilitate transfer of power between the AC and DC networks 50,58.

The parallel-connected sets of series-connected switching elements 40 are switched at zero voltage across the H-bridge to provide low switching losses. Zero voltage is applied across the H-bridge through the controller 60 operating the auxiliary and tertiary sub-converters 38,39 to selectively reduce the respective output voltage to zero in order to minimise a DC voltage at the DC side of the H-bridge. This not only permits switching of the parallel-connected sets of series-connected switching elements 40 at zero voltage across the H-bridge to provide low switching losses, but also obviates the need for additional hardware to minimise a DC voltage at the DC side of the H-bridge.

The switching of the parallel-connected sets of series-connected switching elements 40 to facilitate transfer of power between the AC and DC networks 50,58 requires current to be commutated from the first diagonal switching pair to the second diagonal switching pair and vice versa. Depending on the direction of an AC side current at the AC side of the H-bridge, the current is required to commutate from an upper diode to a lower IGBT of the same set of switching elements 40 or from an upper IGBT to a lower diode of the same set of switching elements 40 during the commutation of current from the first diagonal switching pair to the second diagonal switching pair and vice versa.

For the purposes of this specification, the operation of the first voltage source converter 30 to carry out commutation of current is described with reference to commutation of current from the first diagonal switching pair to the second diagonal switching pair. It will be appreciated that the described operations of the first voltage source converter 30 to carry out commutation of current from the first diagonal switching pair to the second diagonal switching pair applies mutatis mutandis to the operations of the first voltage source converter 30 to carry out commutation of current from the second diagonal switching pair to the first diagonal switching pair.

Figure 3:
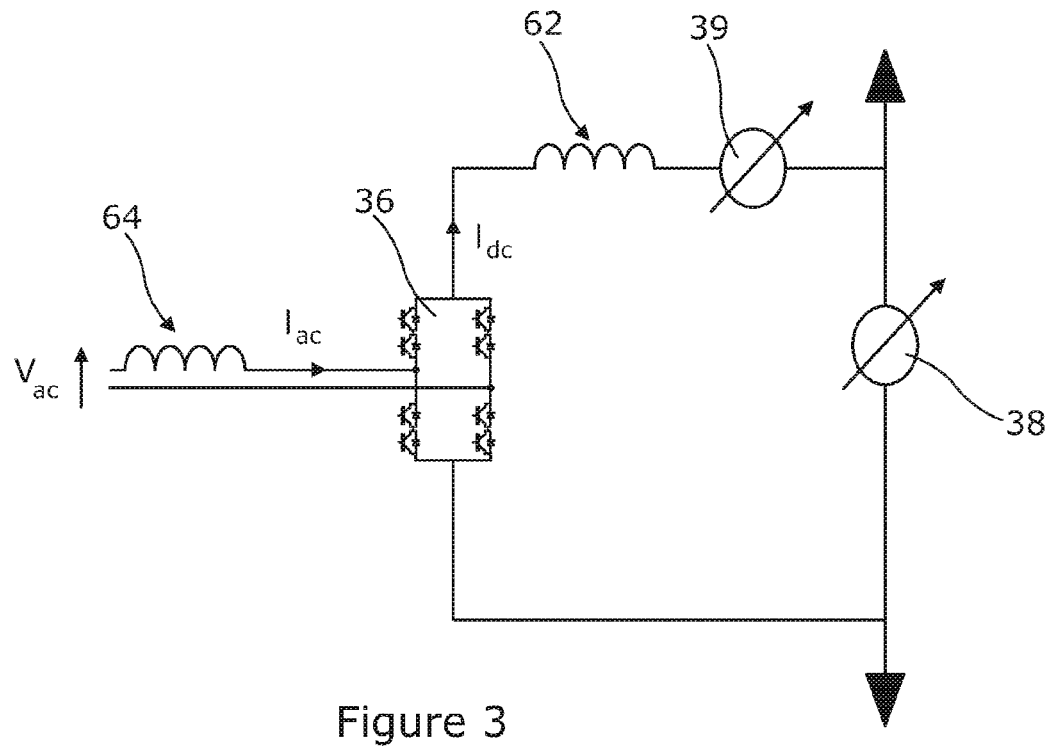
FIG. 3 illustrates, in schematic form, the presence of DC side inductance on the DC side of the H-bridge and the presence of AC side inductance on the AC side of the H-bridge.

As illustrated in FIG. 3, the switching of the parallel-connected sets of series-connected switching elements 40 is performed in the presence of DC side inductance 62 on the DC side of the H-bridge, which is contributed by the modules 52, 53 of the auxiliary and tertiary sub-converters 38,39 and the bus-bars used to connect the H-bridge to the auxiliary and tertiary sub-converters 38,39, and in the presence of AC side inductance 64, which is contributed by the transformer windings 44,46 and other network inductive impedance, on the AC side of the H-bridge.

Figure 4:
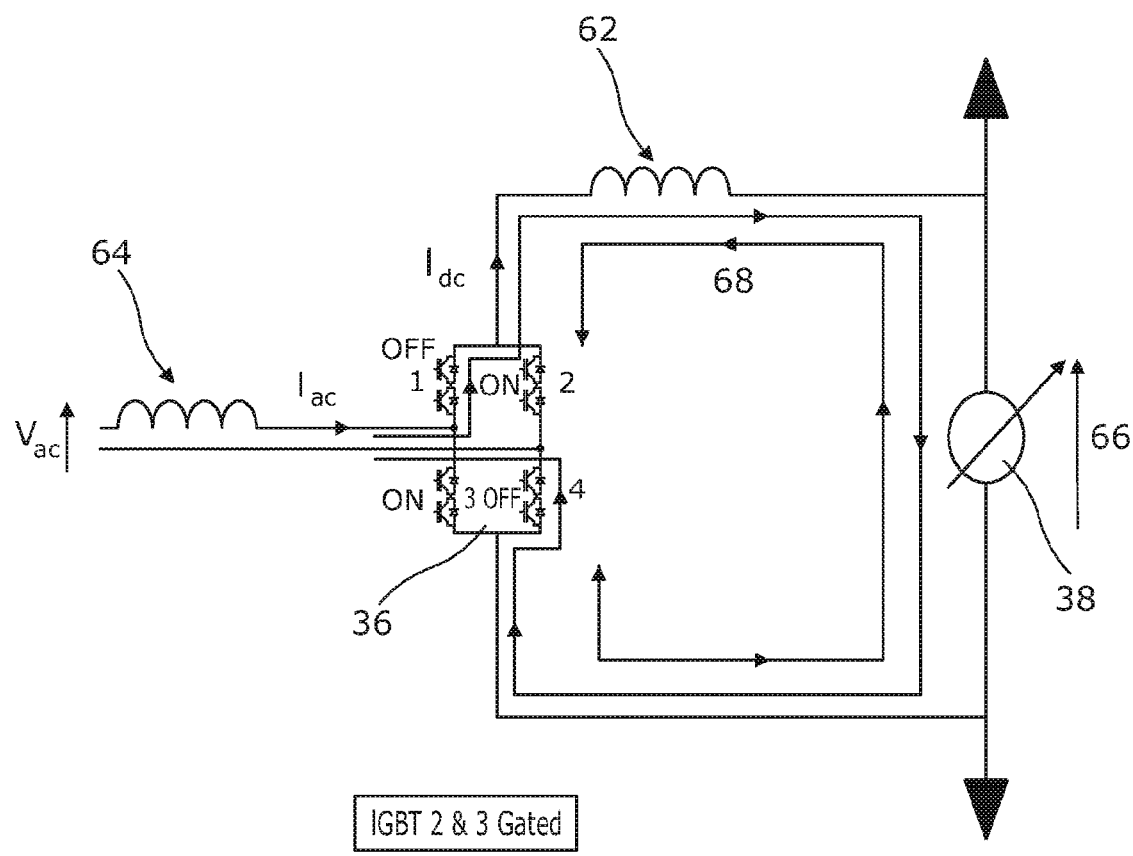
FIG. 4 illustrates, in schematic form, a first commutation operation of the voltage source converter of FIG. 1A.

When the parallel-connected sets of series-connected switching elements 40 are switched to permit current to be transferred from an upper diode to a lower IGBT of the same set of switching elements 40, the controller 60 operates the auxiliary sub-converter 38 in a first commutation operation to selectively synthesise a positive driving commutation voltage 66 to drive 68 a DC side current at a DC side of the H-bridge to zero and then drive it to a negative value equal to an AC side current at an AC side of the H-bridge, as shown in FIG. 4. The driving commutation voltage 66 acts to reverse bias the upper diode. Once the direction of the DC side current is reversed, it can safely flow in the lower IGBT. In other words, synthesis of the driving commutation voltage 66 minimises any differences in magnitude and direction between the DC side current and the AC side current, thus enabling commutation of current from the upper diode to the lower IGBT of the same set of switching elements 40.

Figure 5:
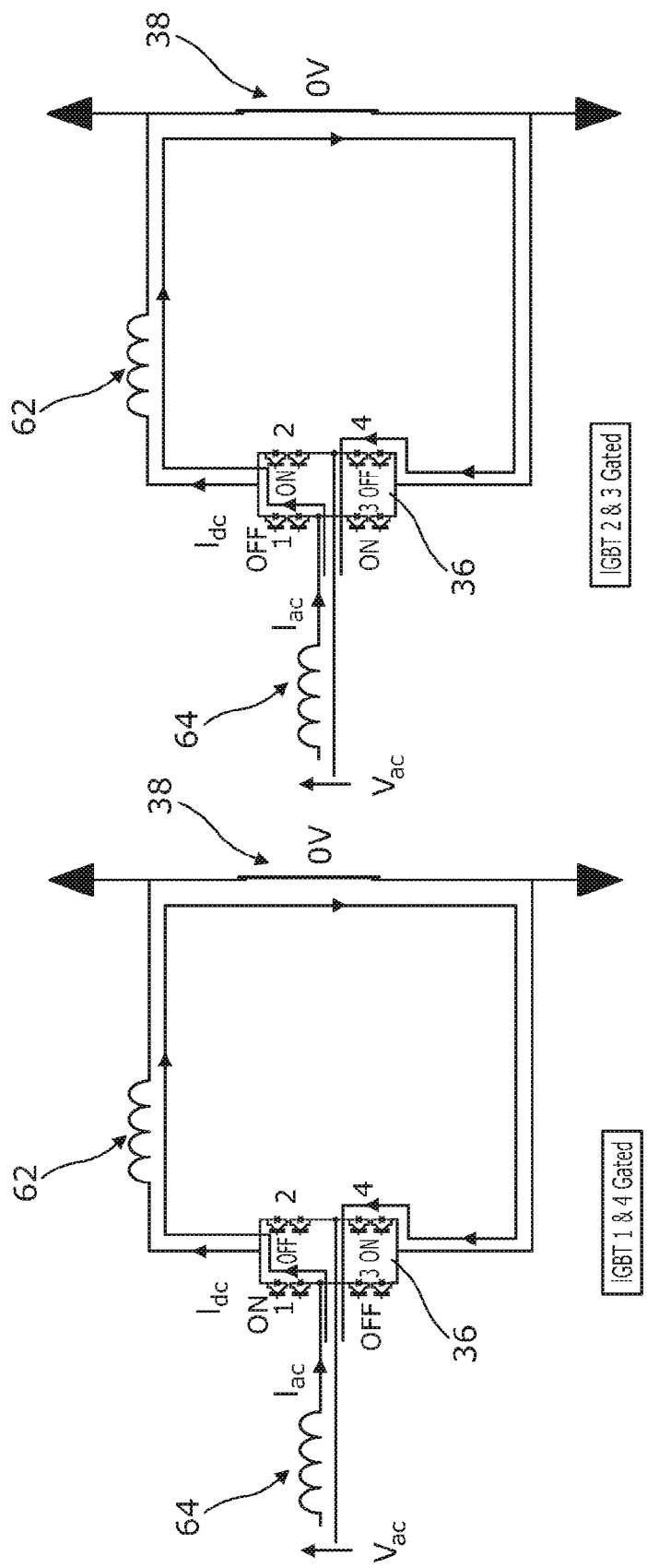
FIG. 5 illustrates, in schematic form, the operation of the VSC of FIG. 1A in the absence of a positive driving commutation voltage.

Without the driving commutation voltage 66, switching of the first and second diagonal switching pairs is insufficient to transfer current from the first diagonal switching pair to the second diagonal switching pair, as shown in FIG. 5.

In FIG. 4, the tertiary sub-converter 39 is depicted as providing a zero voltage thereacross during the synthesis of the positive driving commutation voltage 66 by the auxiliary sub-converter 38. It is envisaged that the positive driving commutation voltage 66 may be synthesised by the tertiary sub-converter 39 instead of the auxiliary sub-converter 38.

In an embodiment, the first commutation operation shown in FIG. 4 prevents the direct series connection of the AC and DC side inductances 64,62 in series with one another at different levels of magnitude and direction of the AC side and DC side currents, which would have resulted in a sudden change in current required to equalise the AC side and DC side currents. The sudden change in current would in turn would have inherently lead to a large (and potentially damaging) voltage transient as a common series current path is formed between the AC and DC side inductances 64,62.

Figure 6:
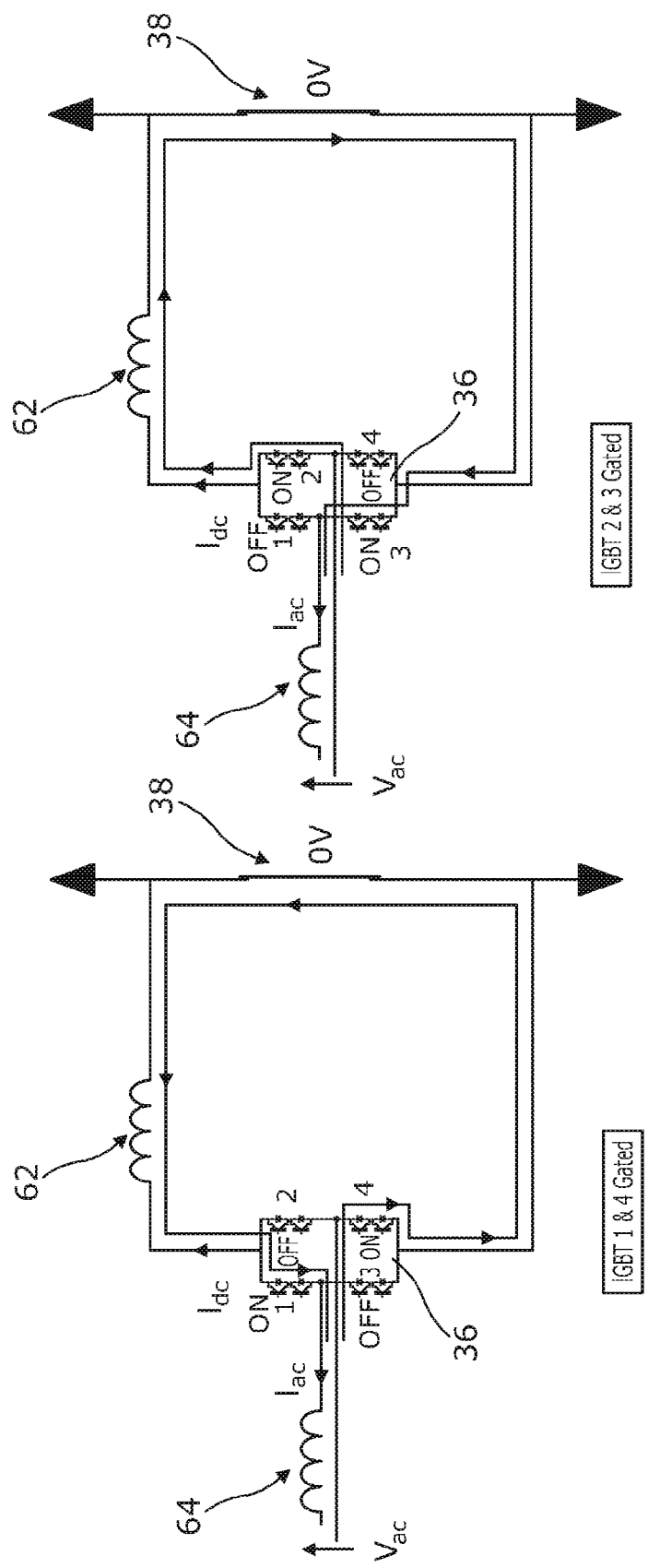
FIG. 6 illustrates, in schematic form, the operation of the VSC of FIG. 1A in the absence of a negative driving commutation voltage.

When the parallel-connected sets of series-connected switching elements 40 are switched to permit current to be transferred from an upper IGBT to a lower diode of the same set of switching elements 40, the H-bridge current is initially flowing in the IGBTs of the first diagonal switching pair, as shown in FIG. 6. Hence, when the IGBTs of the first diagonal switching pair are turned off, the current is abruptly interrupted and must flow in the IGBTs of the second diagonal switching pair because there is no other freewheeling diode path available, thus resulting in a sudden DC side current reversal. It can be seen that the commutation of current from the upper IGBT to the lower diode of the same set of switching elements 40 by forced turn-off of the IGBTs of the first diagonal switching pair is problematic.

In order for current to be reliably and safely commutated from an upper IGBT to a lower diode of the same set of switching elements 40, the following points must be satisfied:

the AC side current should remain nominally constant;
the DC side current should be controlled to reverse direction and be equal to the AC side current;
the AC side current should be temporarily contained within the H-bridge;
a crowbar in respect of the DC network 58 should be applied; and
synthesis of a negative driving commutation voltage is required.

Figure 7A:
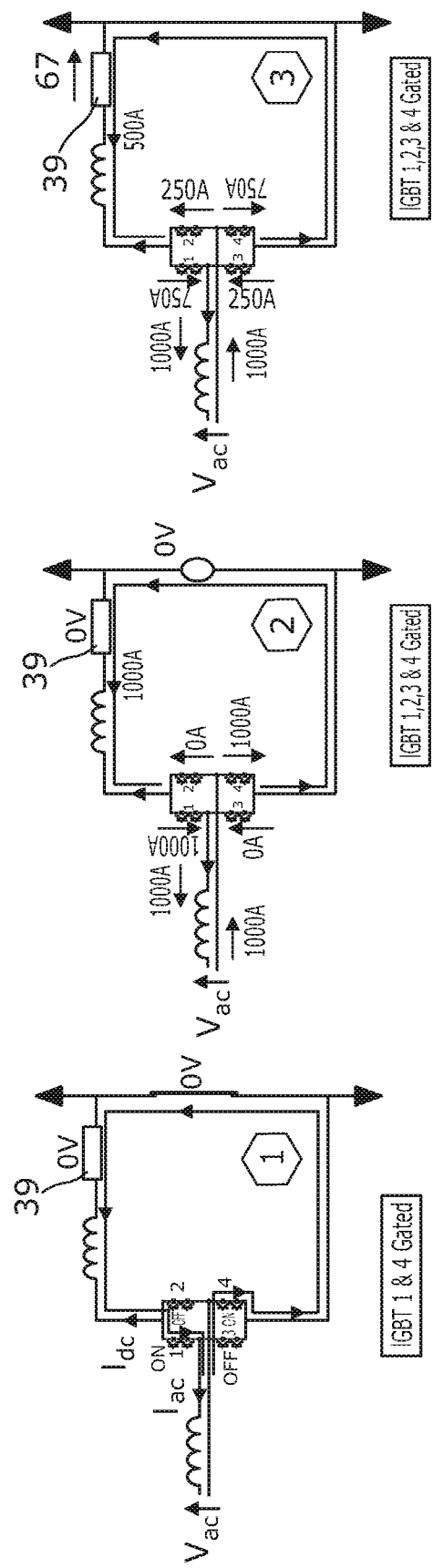
FIGS. 7A and 7B illustrate, in schematic form, a second commutation operation of the voltage source converter of FIG. 1A.
Figure 7B:
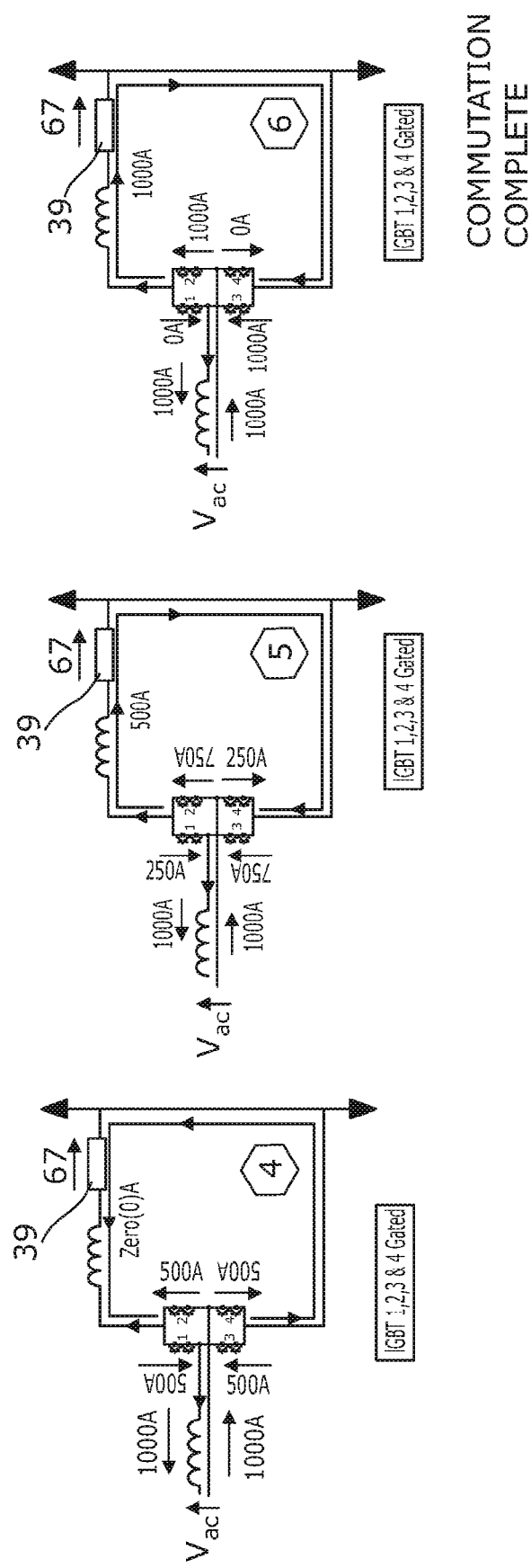

A second commutation operation is carried out as follows, with reference to FIGS. 7A and 7B.

As before, zero voltage is applied across the H-bridge through the controller 60 operating the auxiliary and tertiary sub-converters 38,39 to selectively reduce its output voltage to zero in order to minimise a DC voltage at the DC side of the H-bridge.

All of the IGBTS of the parallel-connected sets of switching elements 40 are switched to their on-states, which results in simultaneous formation of AC and DC crowbars. The AC crowbar defines a current path that permits at least part of an H-bridge current to flow between the AC terminals 42 and to bypass the DC side of the H-bridge. The DC crowbar defines a current path that permits at least part of an H-bridge current to flow in the DC side of the H-bridge and to bypass the AC side of the H-bridge. In this regard the formation of the DC crowbar only affects the respective limb and does not affect the other two limbs.

The controller then operates the tertiary sub-converter 39 to selectively synthesise a negative driving commutation voltage 67, which is applied directly to the DC side inductance 62 by virtue of all IGBTs being switched to their on-states.

Initially the DC side current is driven by the driving commutation voltage to 500 A, with the currents flowing in the IGBTs of the first diagonal switching pair changing from 1000 A to 750 A and with the currents flowing in the IGBTs of the second diagonal switching pair from 0 to 250 A. The driving commutation voltage continues to reduce the DC side current until it is reduced to zero. Thereafter, the driving commutation voltage acts to reverse the DC side current and then drive the DC side current to a negative value equal to the AC side current, thereby commutating the current from an upper IGBT to a lower diode of the same set of switching elements 40 and thereby completing the current commutation from the first diagonal switching pair to the second diagonal switching pair.

Once the commutation operation is complete, the IGBTs of the first diagonal switching pair can be switched off at zero current (i.e. soft switching) and the modules 53 of the tertiary sub-converter 39 can be configured in their bypass modes, i.e. each module 53 of the tertiary sub-converter 39 is configured to provide a zero voltage, until they are required to provide a voltage source.

Formation of the AC and DC crowbars in this manner helps in preventing the occurrence of DC side current reversal that would otherwise result in a large voltage transient at each switching instant of the first and second diagonal switching pairs. Otherwise occurrence of the large voltage transient may lead to converter damage and electromagnetic interference issues, which is unacceptable for a practical converter station in which switching of the first and second diagonal switching pairs occurs continuously and repeatedly. The ability to form the AC and DC crowbars therefore enhances the capability of the first voltage source converter 30 to reliably and safely carry out the commutation operation.

Figure 8A:
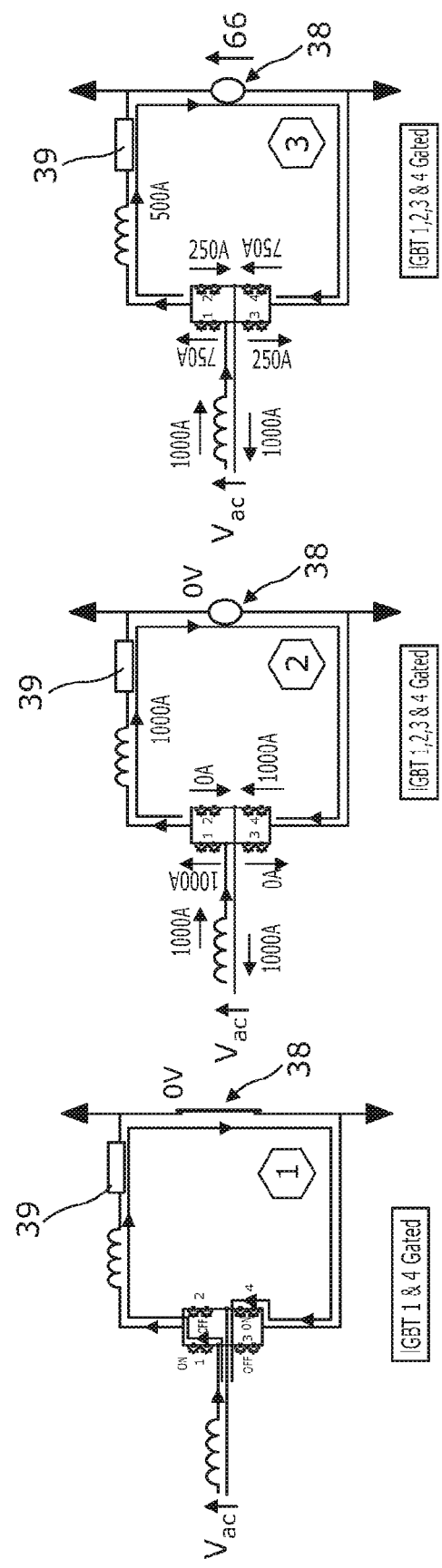
FIGS. 8A and 8B illustrate, in schematic form, a third commutation operation of the voltage source converter of FIG. 1A.
Figure 8B:
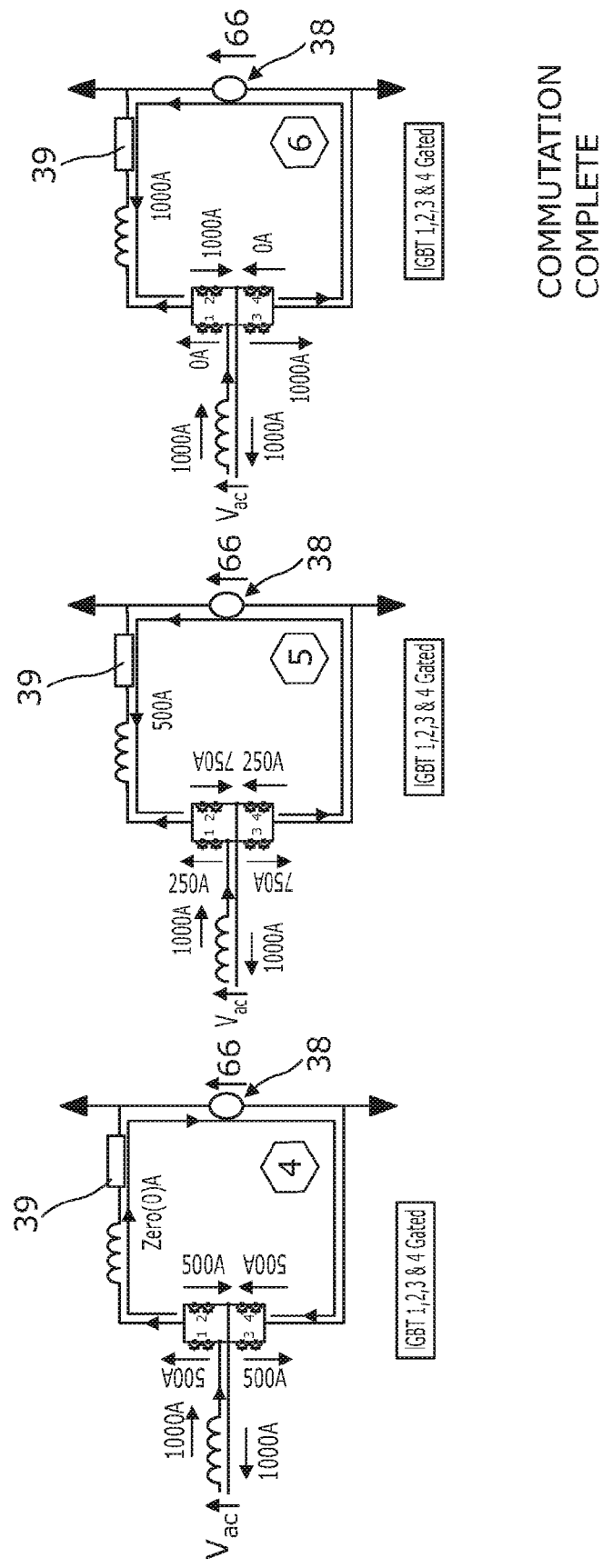

A third commutation operation is carried out to carry out commutation of current from an upper diode to a lower IGBT, as shown in FIGS. 8A and 8B. The third commutation operation is identical to the second commutation operation, except that the controller 60 operates the auxiliary sub-converter 38 (as shown in FIGS. 8A and 8B) to selectively synthesise a positive driving commutation voltage 66 to drive the DC side current to zero and then drive it to a negative value equal to the AC side current and thereby carry out commutation of current from the upper diode to the lower IGBT of the same set of switching elements 40. Similarly to the first commutation operation, it is envisaged that the tertiary sub-converter 39, instead of the auxiliary sub-converter 38, may be operated to synthesise the positive driving commutation voltage 66.

It is envisaged that, in other embodiments of the invention, the auxiliary sub-converter 38 may be configured to include at least one module that is operable to selectively provide a bidirectional voltage source. For example, at least one module of the auxiliary sub-converter 38 may include two pairs of module switches connected in parallel with an energy storage device in a full-bridge arrangement to define a 4-quadrant bipolar module that can provide negative, zero or positive voltage and can conduct current in two directions. Configuring at least one module of the auxiliary sub-converter 38 to be operable to selectively provide a voltage source enables the auxiliary sub-converter 38 to synthesise the negative driving commutation voltage 67.

The provision of the controller 60 in the first voltage source converter 30 of FIG. 1A enables operation of either or both of the auxiliary and tertiary sub-converters 38,39 to cancel any differences in magnitude and direction between the AC and DC side currents when commutating current between the first and second diagonal switching pairs, and thereby enable safe current switching of the first and second diagonal switching pairs. This not only prevents occurrence of the large voltage transient when a common series current path is formed between the AC and DC side inductances 64,62, but also obviates the need to connect large high voltage commutation capacitors at the DC side of the H-bridge, thus improving the reliability of the commutation operations and providing savings in terms of the cost, size and weight of the first voltage source converter 30.

Optionally the controller 60 may be configured to operate either or both of the auxiliary and tertiary sub-converters 38,39 to synthesise the driving commutation voltage to modify the DC side current so as to minimise, rather than cancel, any differences in magnitude and direction between the DC side current and the AC side current. This means that any difference in magnitude between the DC side and AC side currents would be reduced to a near-zero value instead of zero.

The configuration of the first voltage source converter 30 of FIG. 1A minimises the impact of AC and DC side power quality.

Figure 9:
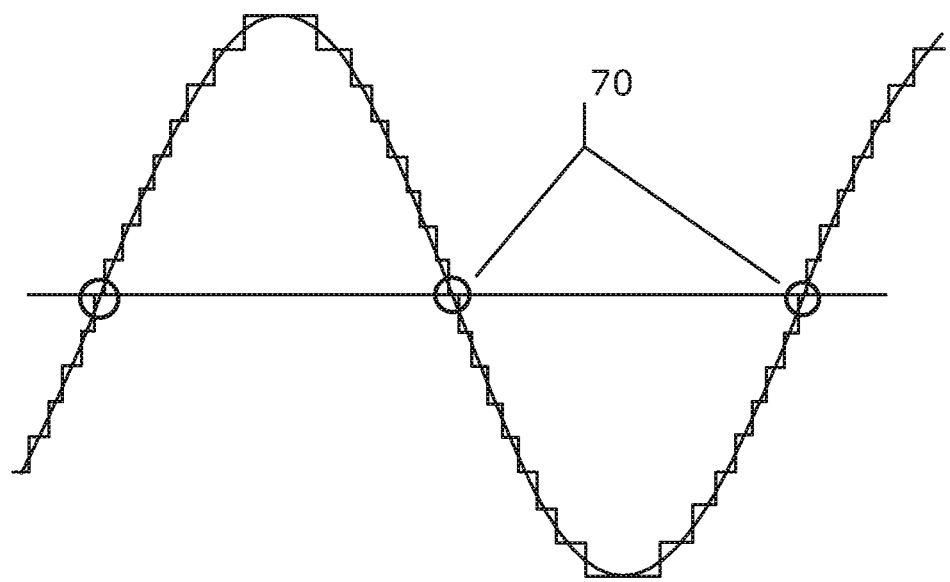
FIG. 9 illustrates, in schematic form, zero crossing periods of a stepped AC voltage at the AC terminals of the VSC of FIG. 1A.

Firstly, during the above-described second and third commutation operations, the formation of the AC and DC crowbars results in a zero voltage appearing at the AC terminals 42. In normal operation of the VSC, the H-bridge and sub-converters 38,39 are operated to generate a stepped approximation of a sinusoidal AC voltage at the AC terminals 42. The stepped approximation means that the AC voltage at the AC terminals 42 will have natural finite zero crossing periods 70, as shown in FIG. 9. As such the controller 60 may be configured to operate either or both of the auxiliary and tertiary sub-converters 38,39 to selectively carry out the commutation of current from one of the first and second diagonal switching pairs to the other of the first and second diagonal switching pairs during each zero crossing period 70 of the AC voltage at the AC terminals 42. This prevents the commutation operation from significantly modifying the AC voltage at the AC terminals 42, thus maintaining a high quality AC voltage at the AC terminals 42, and thereby minimises (or cancels) any adverse impact the commutation operation may have on the AC side power quality.

Secondly the series connection of the tertiary sub-converter 39 and H-bridge permits the operation of the tertiary sub-converter 39, instead of the auxiliary sub-converter 38, to synthesise the driving commutation voltage with minimal impact of the DC voltage of the DC network 58 that appears across the DC terminals 32,34, thus maintaining a high quality DC voltage across the DC terminals 32,34, and thereby minimises (or cancels) any adverse impact the commutation operation may have on the DC side power quality.

During each of the second and third commutation operations, the AC and DC side currents will at one stage be equal in magnitude and direction. At this time the AC crow-bar can be removed by turning off two of the IGBTs. The timing of turn-off of these IGBTS is critical to ensure proper commutation of current between the first and second diagonal switching pairs.

Figure 10:
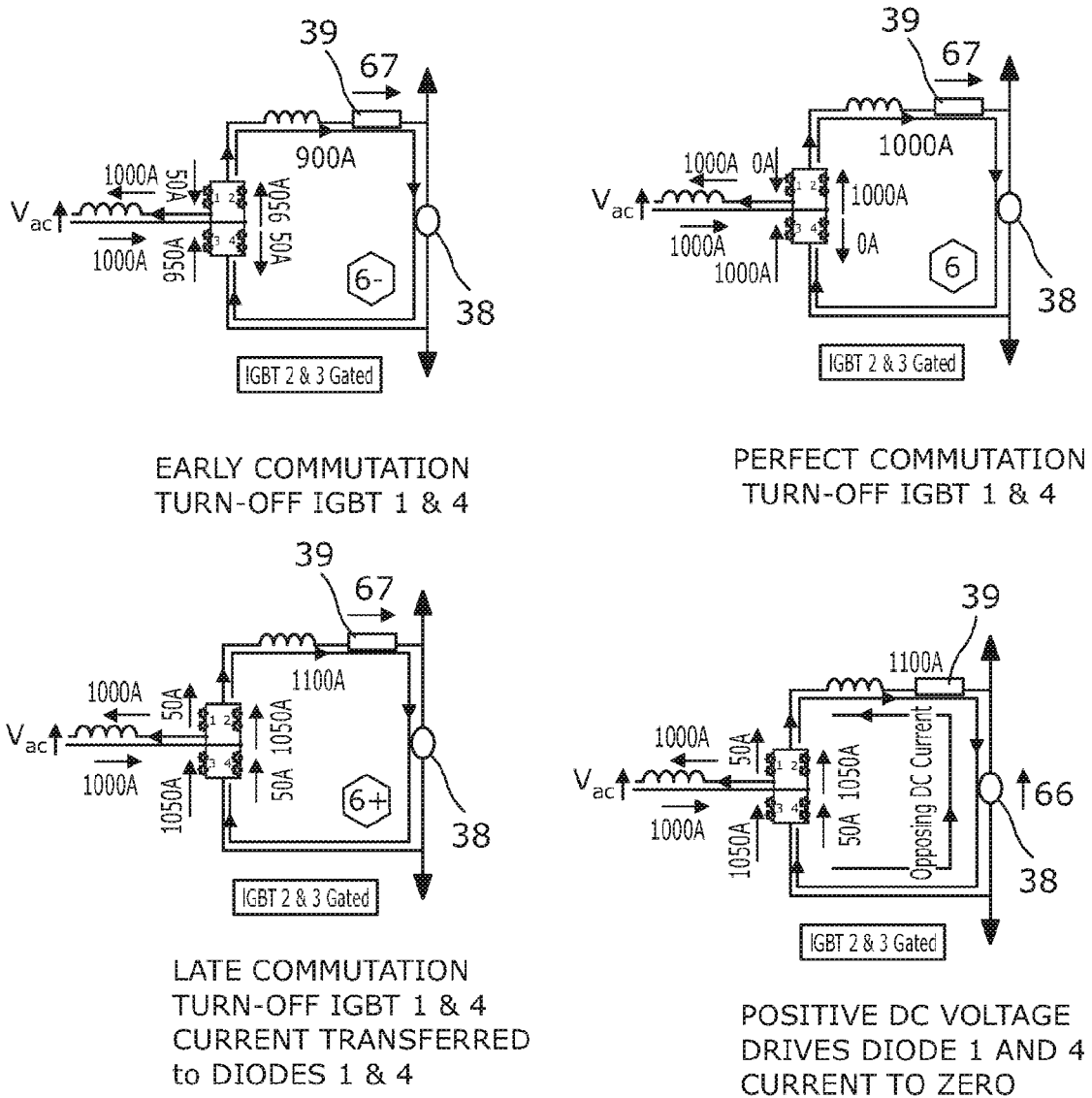
FIG. 10 illustrates, in schematic form, the outcomes of turning off the IGBTs at different times during the commutation operation of the voltage source converter of FIG. 1A.

In the second commutation operation, if the relevant IGBTs are turned off before the AC side and DC side currents are equal in magnitude, these IGBTs will turn off with finite current flowing therethrough, as shown in FIG. 10. This will result in an inherent voltage transient created by the difference in current flowing in the AC and DC side inductances 64,62 when they are connected in series. As such the relevant IGBTs may be turned off after the DC side current has exceeded the AC side current in magnitude, to prevent creation of the inherent voltage transient.

On the other hand, in the second commutation operation, if the relevant IGBTs are turned off after the DC side current has exceeded the AC side current in magnitude, the current in each turned off IGBTs will transfer to the corresponding anti-parallel diode, as shown in FIG. 10. This means that the turn off of the relevant IGBTs will have no immediate effect on the current flow in the H-bridge. Under these circumstances, the anti-parallel diode can be turned off safely at zero current by operating either or both of the auxiliary and tertiary sub-converters 38,39 to provide a voltage to drive the current in the anti-parallel diode to zero subsequent to the transfer of current from the turned off IGBT to the anti-parallel diode, as shown in FIG. 10. Such a voltage can also be provided in the normal course of either or both of the auxiliary and tertiary sub-converters 38,39 constructing a rectified sinusoidal voltage at the DC side of the H-bridge.

In this manner the controller is configured to control the timing of the switching of the first and second diagonal switching pairs to permit transfer of current from the IGBT to the anti-parallel diode of the same switching element 40 during synthesis of the driving commutation voltage. This ensures that there is no finite current flowing in the IGBT prior to being turned off, thus minimising switching losses.

In the third commutation operation, if the relevant IGBTs are turned off after the DC side current has exceeded the AC side current in magnitude, the currents in the corresponding anti-parallel diodes will have transferred to the respective IGBTs before the relevant IGBTS are turned off. As such these IGBTs will turn off with finite current flowing therethrough, thus resulting in the earlier-described inherent voltage transient. To prevent the creation of the inherent voltage transient, the controller 60 is configured to turn off the relevant IGBTs before the AC side and DC side currents become equal in magnitude and direction.

In this manner the controller is configured to control the timing of the switching of the first and second diagonal switching pairs to prevent transfer of current from the anti-parallel diode to the IGBT of the same switching element 40 during synthesis of the driving commutation voltage. This prevents the IGBT from being switched at finite current.

Figure 11:
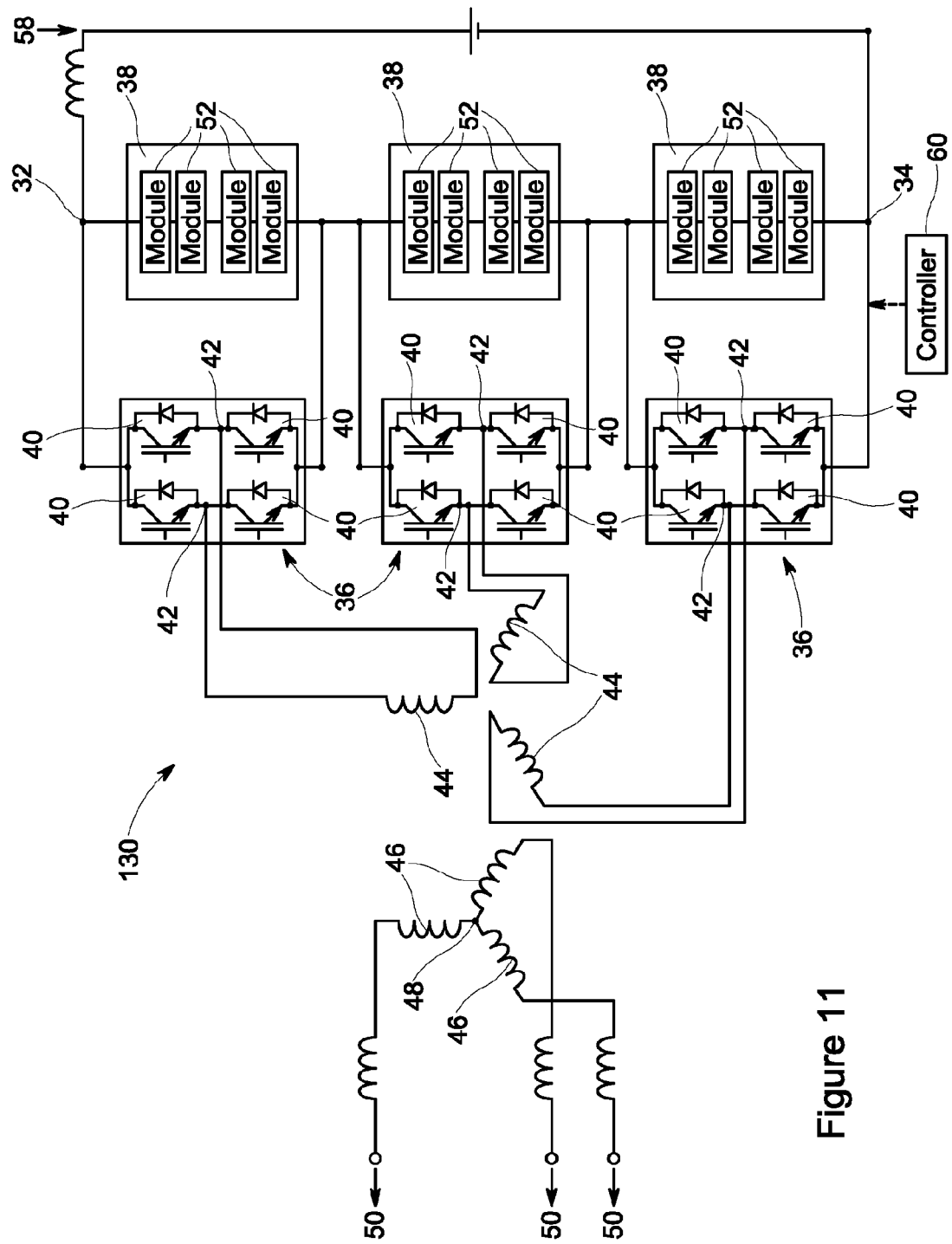
FIG. 11 shows, in schematic form, a voltage source converter according to a second embodiment of the invention.

A second voltage source converter 130 according to a second embodiment of the invention is shown in FIG. 11. The second voltage source converter 130 is similar in structure and operation to the first voltage source converter 30 of FIG. 1A, and like features share the same reference numerals.

The second voltage source converter 130 differs from the first voltage source converter 30 in that each phase element 36 of the second voltage source converter 130 omits the respective tertiary sub-converter 39.

As mentioned earlier, in order to enable the auxiliary sub-converter 38 to synthesise the negative driving commutation voltage 67, the auxiliary sub-converter 38 may be configured to include at least one module that is operable to selectively provide a bidirectional voltage source.

There is provided a third voltage source converter according to a third embodiment of the invention. The third voltage source converter is similar in structure and operation to the first voltage source converter 30 of FIG. 1A, and like features share the same reference numerals.

Figure 12:
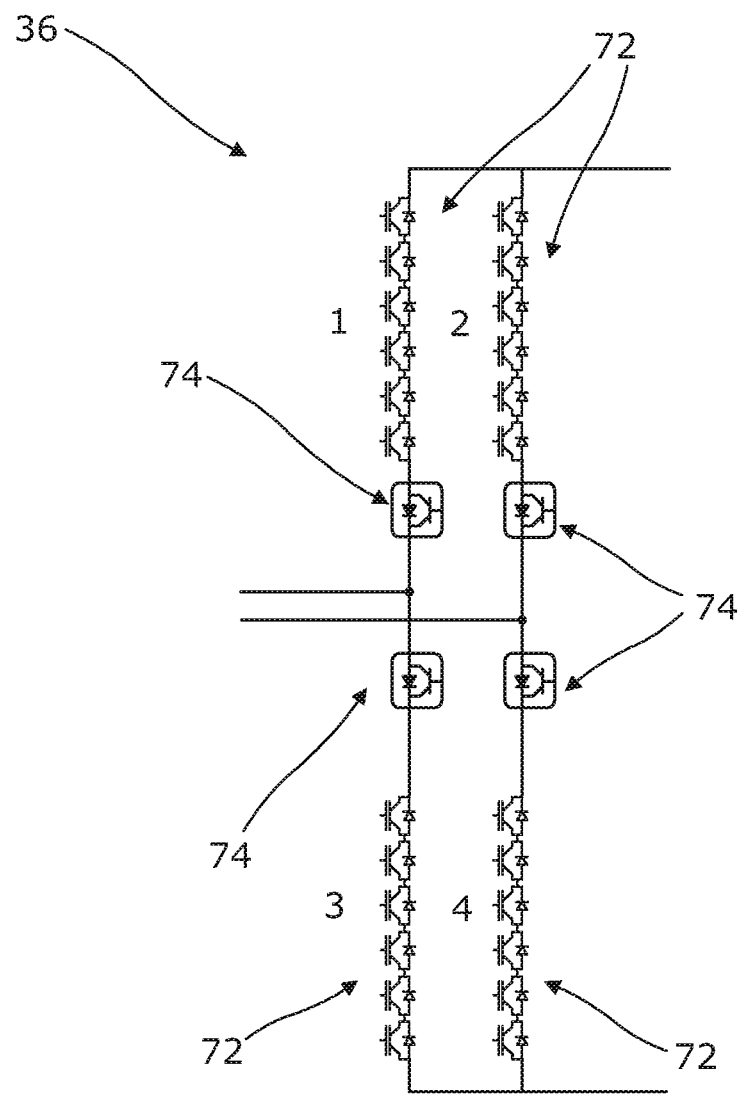
FIG. 12 shows, in schematic form, an H-bridge of a voltage source converter according to a third embodiment of the invention.

The third voltage source converter differs from the first voltage source converter 30 in that each switching element 40 includes a plurality of first IGBTs 72 connected in inverse-series with a plurality of second IGBTs 74 so as to provide the H-bridge with forward and reverse voltage capabilities, as shown in FIG. 12. Each IGBT 72,74 is connected in parallel with an anti-parallel passive current check element in the form of a single diode.

The number of first IGBTs 72 is selected to be higher than the number of second IGBTs 74 to provide the H-bridge with asymmetrical forward and reverse voltage capabilities. In the embodiment shown, the forward voltage capability of the H-bridge is higher than the reverse voltage capability of the H-bridge. The level of reverse voltage capability required (and hence the number of second IGBTs 74) is determined by the requirements of the commutation operation.

With reference to the earlier-described first commutation operation, the controller 60 operates the auxiliary sub-converter 38 to synthesise a positive driving commutation voltage 66 to enable soft commutation of current from the upper diode to the lower IGBT of the same set of switching elements 40. A similar soft commutation of current from the upper IGBT to the lower diode of the same set of switching elements 40 requires operation of the tertiary sub-converter 39 to synthesise a negative driving commutation voltage 67. However, the configuration of the H-bridge of the first voltage source converter 30 means that the switching elements 40 are incapable of supporting the negative driving commutation voltage 67 because the anti-parallel diodes will be forced into uncontrolled conduction.

Configuring the switching elements 40 to provide the H-bridge with forward and reverse voltage capabilities permits operation of the third voltage source converter to reliably carry out commutation of current not only from the upper diode to the lower IGBT of the same set of switching elements 40, but also from the upper IGBT to the lower diode of the same set of switching elements 40, the latter of which is described as follows.

Figures 13A, 13B:
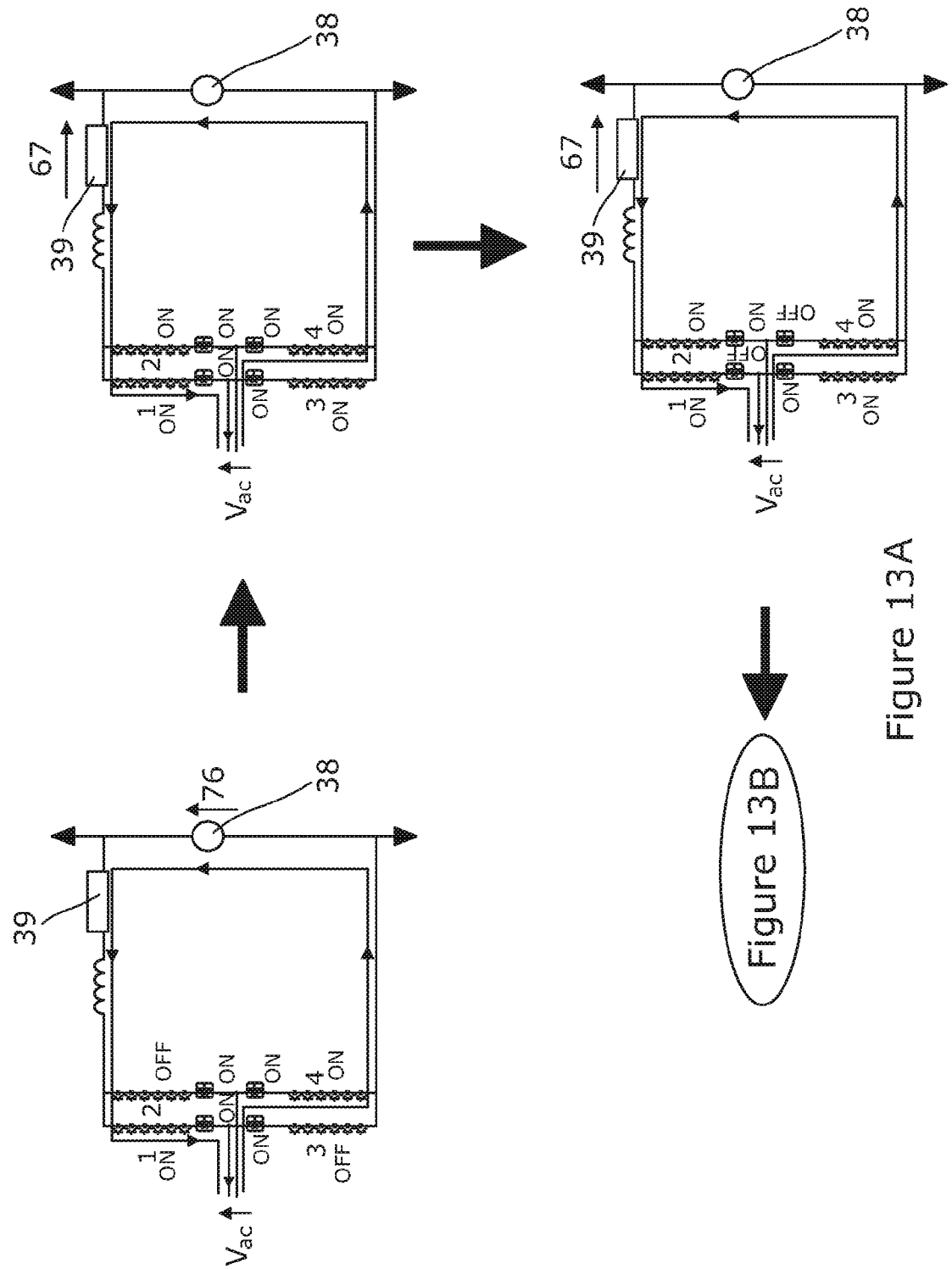
FIGS. 13A and 13B illustrate, in schematic form, a commutation operation of the voltage source converter of FIG. 12.

Prior to the commutation operation, the auxiliary sub-converter 38 is operated to inject positive voltage steps 76 that traverse an off-set rectified sinusoid. The injection of the positive voltage steps means the anti-parallel diodes corresponding to the second IGBTs 74 are forward biased and thereby not able to support any voltage, as shown in FIG. 13A. Meanwhile the second IGBTs 74 are turned on so that each second IGBT-diode pair forms a conducting AC switch, and the first IGBTs 72 of two of the switching elements 40 are turned off to allow its corresponding diode to support a voltage.

When commutation from an upper IGBT to a lower diode of the same set of switching elements 40 is required, the controller 60 operates the tertiary sub-converter 39 to synthesise the negative driving commutation voltage 67. At this stage the controller 60 switches the switching elements 40 during synthesis of the negative driving commutation voltage 67 to configure each first IGBT 72 in electrical bypass and to turn off the second IGBTs 74 of two of the switching elements 40 to allow its corresponding diode to support a voltage, as shown in FIG. 13A. Meanwhile the anti-parallel diodes corresponding to the first IGBTs 72 are forward-biased and cannot support the negative driving commutation voltage 67.

FIG. 13B illustrates the modification of the DC side current by the negative driving commutation voltage 67 to minimise any differences in magnitude and direction between the DC side current and the AC side current. As the DC side current reaches zero, the diodes corresponding to the turned-off second IGBTs 74 naturally turn off, and the turned-off second IGBT-diode pairs operate in their off states to support the negative driving commutation voltage 67. Thereafter, the third voltage source converter is configured to revert to its pre-commutation operation configuration, in which the auxiliary sub-converter 38 is operated to inject positive voltage steps that traverse an off-set rectified sinusoid, the anti-parallel diodes corresponding to the second IGBTs 74 are forward biased and thereby not able to support any voltage, the second IGBTs 74 are turned on so that each second IGBT-diode pair forms a conducting AC switch, and the first IGBTs 72 of two of the switching elements 40 are turned off to allow its corresponding diode to support a voltage.

In contrast, the use of an H-bridge with a unidirectional voltage capability (i.e. the H-bridge is incapable of supporting both forward and reverse voltages) in a voltage source converter means that such a voltage source converter is capable of reliably carrying out commutation of current from one of the first and second diagonal switching pairs to the other of the first and second diagonal switching pairs for only one AC side current direction, but not both, thus limiting the current commutation capabilities of such a voltage source converter.

The respective numbers of first and second IGBTs 72,74 may vary to provide the H-bridge with a range of forward and reverse voltage capabilities. Configuring the H-bridge in this manner permits optimisation of the number of IGBTs 72,74 in the third voltage source converter whilst meeting the requirements of the commutation operation.

In the embodiments shown, the AC terminals of each phase element 36 are connected to a respective phase of a three-phase AC network 50. It is envisaged that, in other embodiments, the number of limbs in the voltage source converter may vary with the number of phases of a multi-phase AC network, and the AC terminals of each phase element may be connected to a respective phase of the multi-phase phase AC network. It is envisaged that, in other embodiments, the voltage source converter may include a single limb, and the AC terminals of each phase element may be connected to a single phase AC network.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A voltage source converter comprising first and second DC terminals for connection to a DC network, the voltage source converter further including at least one limb connected between the first and second DC terminals, the or each limb including:
    a phase element including two parallel-connected sets of series-connected switching elements connected in an H-bridge to define first and second diagonal switching pairs, a respective junction between each set of series-connected switching elements defining an AC terminal for connection to an AC network; and
    a sub-converter configured to be controllable to act as a voltage waveform synthesizer;
    wherein the voltage source converter further includes a controller to operate the sub-converter to synthesize a driving commutation voltage to modify a DC side current at a DC side of the H-bridge so as to cancel any differences in magnitude and direction between the DC side current and the AC side current when carrying out commutation of current from one of the first and second diagonal switching pairs to the other of the first and second diagonal switching pairs.

2. The voltage source converter according to claim 1, wherein the sub-converter is connected in parallel with the phase element or in series with the H-bridge.

3. The voltage source converter according to claim 1, wherein the sub-converter is connected in series and/or parallel with the H-bridge at the DC side of the H-bridge, and/or wherein the sub-converter is connected in parallel with an electrical block including the phase element at the DC side of the H-bridge.

4. The voltage source converter according to claim 1, wherein each switching element includes at least one active switching device connected in parallel with an anti-parallel passive current check element.

5. The voltage source converter according to claim 1, wherein the controller is configured to operate the sub-converter to selectively modify its output voltage to reduce a DC voltage at the DC side of the H-bridge.

6. The voltage source converter according to claim 1, wherein the controller is further configured to operate the sub-converter to selectively carry out the commutation of current from one of the first and second diagonal switching pairs to the other of the first and second diagonal switching pairs during a zero crossing period of an AC voltage at the AC terminals.

7. The voltage source converter according to claim 1, wherein each switching element includes an active switching device connected in parallel with an anti-parallel passive current check element, and the controller is configured to control the timing of the switching of the first and second diagonal switching pairs to prevent transfer of current from the anti-parallel passive current check element to the active switching device of the same switching element during synthesis of the driving commutation voltage.

8. The voltage source converter according to claim 1, wherein the sub-converter includes at least one module, the or each module being operable to selectively provide a voltage source.

9. The voltage source converter according to claim 8, wherein the or each module includes at least one module switch and at least one energy storage device, the or each module switch and the or each energy storage device in the or each module combining to selectively provide a voltage source.

10. The voltage source converter according to claim 1, wherein the controller is configured to selectively switch the parallel-connected sets of series-connected switching elements to form an AC crowbar when operating the sub-converter to synthesize the driving commutation voltage, the AC crowbar defining a current path that permits at least part of an H-bridge current to flow between the AC terminals and to bypass the DC side of the H-bridge.

11. The voltage source converter according to claim 10, wherein the controller is configured to selectively switch at least one of the parallel-connected sets of series-connected switching elements to form a DC crowbar when operating the sub-converter to synthesize the driving commutation voltage, the DC crowbar defining a current path that permits at least part of an H-bridge current to flow in the DC side of the H-bridge and to bypass the AC side of the H-bridge.

12. The voltage source converter according to claim 11, wherein the controller is configured to selectively switch the parallel-connected sets of series-connected switching elements to simultaneously form the AC and DC crowbars when operating the sub-converter to synthesize the driving commutation voltage.

13. The voltage source converter according to claim 1, wherein each switching element includes an active switching device connected in parallel with an anti-parallel passive current check element, and the controller is configured to control the timing of the switching of the first and second diagonal switching pairs to permit transfer of current from the active switching device to the anti-parallel passive current check element of the same switching element during synthesis of the driving commutation voltage.

14. The voltage source converter according to claim 13, wherein the controller is configured to operate the sub-converter to provide a voltage to drive the current in the anti-parallel passive current check element to zero subsequent to the transfer of current from the active switching device to the anti-parallel passive current check element.

15. The voltage source converter according to claim 1, wherein each switching element includes at least one first switching device connected in inverse-series with at least one second switching device so as to provide the H-bridge with forward and reverse voltage capabilities.

16. The voltage source converter according to claim 15, wherein the controller is configured to switch the switching elements during synthesis of the driving commutation voltage to configure each first switching device in electrical bypass and to configure at least one second switching device to support at least part of the driving commutation voltage.

17. The voltage source converter according to claim 15, wherein the respective numbers of first and second switching devices are selected to provide the H-bridge with asymmetrical forward and reverse voltage capabilities.

18. The voltage source converter according to claim 1, further comprising a plurality of limbs, the phase element of each limb being connectable via its AC terminals to a respective phase of a multi phase AC network.

19. The voltage source converter according to claim 18, wherein the plurality of limbs are connected in series between the first and second DC terminals.

* * * * *